Dec. 13, 1955
J. R. BAYSTON
2,726,516
EVAPORATOR FOR PRODUCING ICE CUBES
AND METHOD OF MAKING SAME
Filed June 29, 1953
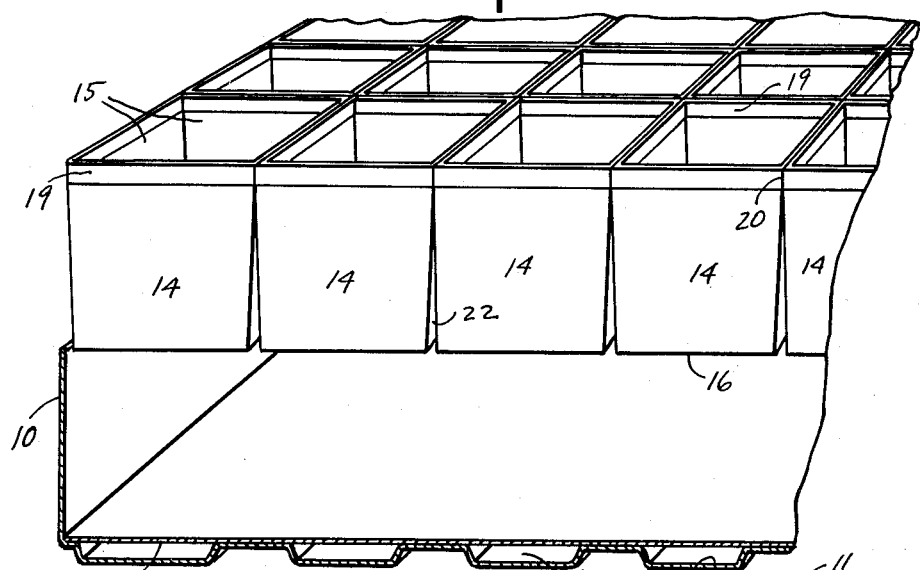
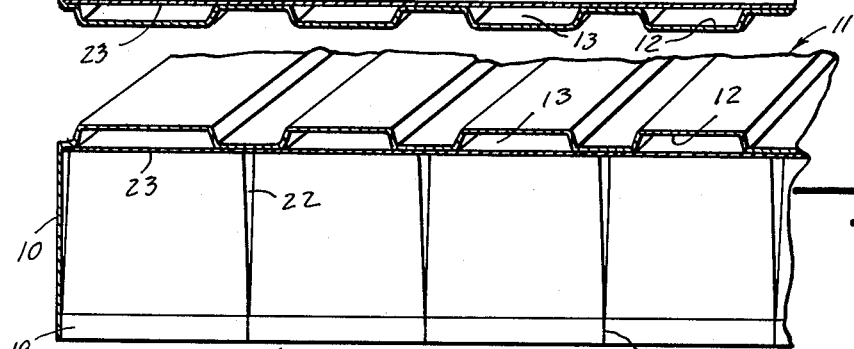
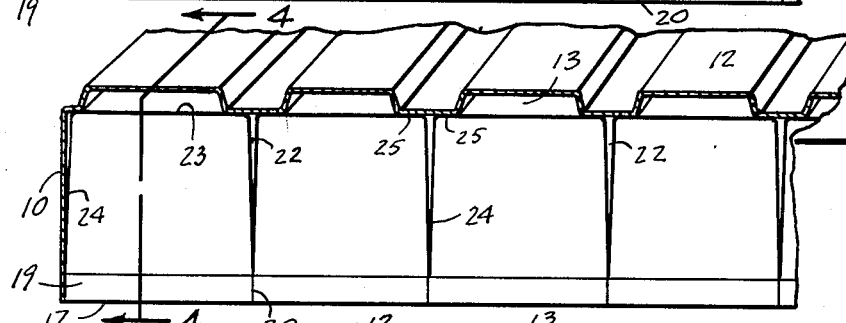
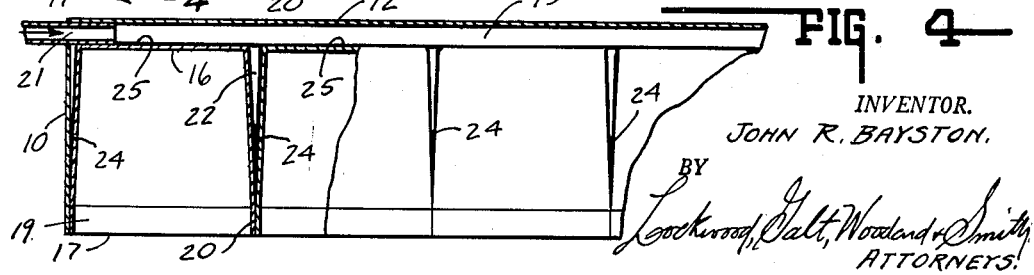
INVENTOR.
JOHN R. BAYSTON.
BY
Lockwood, Galt, Woodard & Smith
ATTORNEYS.

United States Patent Office 2,726,516
Patented Dec. 13, 1955

2,726,516

EVAPORATOR FOR PRODUCING ICE CUBES AND METHOD OF MAKING SAME

John R. Bayston, Van Nuys, Calif., assignor to John R. Bayston, trustee, Icecrafter (Liquidating) Trust, Van Nuys, Calif.

Application June 29, 1953, Serial No. 364,793

4 Claims. (Cl. 62—105)

This invention relates to an evaporator for producing ice cubes and the method of forming the same, particularly applicable for use in automatic ice cube making machines of the character disclosed in Letters Patent to Bayston No. 2,563,093, granted August 7, 1951, for Ice Making Machine, and Letters Patent to Erickson et al., No. 2,583,294, granted January 22, 1952, for Ice Making Machine.

The invention is concerned with a simple and inexpensive method of associating together a plurality of cube ice forming cells secured and embraced within a shell preformed to provide a closure having a plurality of passages for the refrigerant or coolant, on the one hand, and defrosting hot gases on the other hand, all as more particularly set forth and described in the above-mentioned letters patent.

This is accomplished by first forming a shell with a series of ducts, and with the shell in inverted position, placing over the ducts a sheet of brazing material, such as that known in the trade as "Silfos." With the shell in inverted position the series of cells is placed therein, the closed ends of the cells being in contact with the brazing shell. Upon the shell with the positioned brazing sheet and cells being again inverted with the closed ends of the cells uppermost, the assembly is heated to a brazing temperature, causing the brazing material to melt and flow downwardly between the cells in a manner to braze them to each other at their point of juncture while sufficient brazing material remains between the closed ends of the cells and the duct portion of the shell to simultaneously secure the cells in place relative thereto.

The full nature of the invention will be understood from the accompanying drawings and the following description and claims:

Fig. 1 is a perspective view of the inverted shell with the brazing sheet in place and a group of cells to be secured therein before being set upon the brazing sheet, the assembly being shown in cross section with portions broken away.

Fig. 2 is illustrative of the shell in its normal operating position with the cells inverted prior to the brazing step, being shown in section with portions broken away.

Fig. 3 is the same as Fig. 2 showing the assembly after the brazing step with the cells brazed to each other and to the shell, with the shell shown in section and portions broken away.

Fig. 4 is the same as Fig. 3 showing a section of the shell taken on the line 4—4 of Fig. 3 and with certain cells shown in elevation.

In the drawings there is shown a completely formed evaporator for producing ice cubes such as may be employed in the ice making machines of the above-mentioned Letters Patent, and as shown in Figs. 3 and 4. Said evaporator includes an outer shell, preferably formed of copper by drawing, and having a peripheral wall 10 and a top plate 11. Said top plate is formed with a series of trough-like grooves 12 to provide refrigerant channels or passages 13.

Embraced within the shell there is provided a series of individual ice cube forming cells 14. Each of said cells is formed with four side walls 15 tapering slightly from the lower portion of the cell at its open end upwardly and inwardly and terminating in a top wall 16. While shown herein as square or rectangular in cross section, said cells may be of any other cross sectional shape such as a circle or oval in cross section, depending upon the desired form of the cubes. Adjacent the open end 17 of each cell there is formed a section thereof having a flat band or wall portion 19 so as to abut the corresponding wall portion of the next adjacent cell as at 20. Said cells may be drawn or otherwise formed individually from suitable heat conducting material such as copper.

When the evaporator is assembled as shown in Figs. 3 and 4, the refrigerant passages or channels 13 are located to extend substantially centrally of and over the top wall 16 of the respective in-line cells. A suitable refrigerant may be caused to enter as at 21 and pass through said channels, either in series or in parallel. The refrigerant will not only be carried in direct contact with the top walls 16 of each cell, but will also circulate about the side walls 15 of each cell, due to their tapered relation which provides the refrigerant passages 22 in communication with the channels 13, as shown in Fig. 4. By reason of the parallel abutting bands or wall portions 19 the passage spaces 22 between the walls of the cells will be sealed at the bottom.

Said evaporator, as above described and illustrated herein, is formed by first drawing or otherwise forming the shell as shown in Fig. 1, having the side walls 10 and parallel series of spaced ducts 12. After drawing the shell it is cleaned by dipping in a suitable cleaning solution and is then placed top down for receiving over the ducts a sheet 23 of brazing material, of any suitable character, but preferably with what is commercially known as "Silfos."

The individual cells 14 are formed by any suitable method, such as drawing, stamping and the like, and are similarly cleaned, whereupon they are assembled and set upon the sheet 23 of brazing material within the shell and confined by the walls 10, in the manner illustrated in the upper portion of Fig. 1.

The assembly is then inverted to the normal position of the cells with the open end down, as shown in Fig. 1, whereupon said assembly is run through an atmosphere oven at a brazing temperature of approximately 1800 degrees F. As illustrated in Figs. 3 and 4, as distinguished from Fig. 2, the sheet 23 of brazing material will be melted, and due to its affinity for the copper surfaces will flow down the side walls of the cells, a film thereof remaining on the side walls which serves to seal any porosity thereof with the residue lodging at the juncture of adjacent cells, as indicated at 24. At the point of contact between the top plate 11 of the shell and the top walls 16 of the cells, a portion of the brazing material will be lodged as indicated at 25. Thus, the point of brazing at 25 will fixedly secure the cells within the shell, the outer surface of the several cells will receive a sealing film and the open end portion of each cell will be sealed to the adjacent cell as at 24 for sealing the refrigerant passages 22 against escape of gases.

As a result of the above, a most efficient evaporator structure is produced in an economical and more efficient manner than heretofore practiced, through the simple assembly of the preformed shells, interposing a sheet of brazing material therebetween and subjecting it to the necessary brazing temperatures; and wherein the entire periphery, all four side walls, of each individual cell, as well as its closed top surface, is directly subjected to the action of the coolant or refrigerant flowing into and through the several passages.

The invention claimed is:

1. An evaporator unit comprising an assembly of ice cube forming cells, each closed at one end to provide a top wall surface and open at the other end, a portion of the walls of each cell adjacent its open end being in abutting engagement with those of the adjacent cells, a shell surrounding and embracing said assembly of cells having side walls in abutting relation with the adjacent open end portions of the outer series of cells, said shell including an integral top plate extending over the closed top walls of said cells, a series of channels formed in said top plate extending in parallel relation over in-line cells and in communication with the space defined by the side walls of said cells to provide refrigerant passages, and means for securing said top plate to the respective cells and said cells to each other in sealing relation.

2. An evaporator unit comprising an assembly of individual ice cube forming cells, each of said cells including a closed top wall and side walls tapering inwardly and upwardly from an open end toward the top wall, the lower portion of each of the side walls being formed in parallel abutting relation with adjacent cells, a shell surrounding and embracing said assembly of cells having side walls in abutting relation with the adjacent parallel portions of the cell walls, said shell including an integral top plate extending over and abutting the closed top walls of said cells, a series of channel forming grooves formed in said top plate extending in parallel relation over in-line cells and in communication with the space defined by the tapered side walls of said cells, and a film of brazing material interposed between the abutting portion of said top plate and closed top walls of said cells and between the tapered side walls of said cells adjacent the parallel portions thereof for securing said cells within said shell and providing a seal between said cells and shell adjacent the open ends thereof.

3. In a method of forming an evaporator for producing ice cubes comprising an outer shell formed with a series of parallel channel forming grooves to provide refrigerant passages and a group of separate and individual cells sealed therein in side wall tapering relation with their open end portions abutting, consisting in positioning said shell to receive said cells, placing a sheet of brazing material within said shell to span said channel forming grooves, assembling a plurality of said cells within said shell with their top walls seating upon said sheet of brazing material and their open end portions abutting each other and the side walls of said shell, and heating said assembly to a brazing temperature until the brazing material has been melted to flow downwardly over the spaced portion of the adjacent tapered side walls of said cells into sealing relation with the abutting wall portions of said cells and shell.

4. The method of forming an evaporator for producing ice cubes comprising the steps of preforming a shell with side walls and a closure plate formed with a parallel series of channel forming grooves, placing a sheet of brazing material over the inner surface of said closure plate to span the channels formed by said grooves, preforming a plurality of separate and individual cells having tapered side walls and closed top walls, assembling a group of said cells within said shell to be embraced thereby with a portion of their tapered side walls abutting to provide a junction thereof and said closed walls seating upon said sheet of brazing material, positioning said assembly with the sheet of brazing material overlying said cells, and bringing said assembly to a brazing heat to melt the brazing material and cause it to flow downwardly over the spaced portion of the tapered side walls of said cells to provide a film thereover and lodge in the junction of said cells with each other and with said shell to secure said cells together and within said shell in sealing relation.

References Cited in the file of this patent
UNITED STATES PATENTS

| | | |
|---|---|---|
| 100,243 | Sturtevant | Feb. 22, 1870 |
| 436,883 | Wagandt | Sept. 23, 1890 |
| 953,252 | Brinkman | Mar. 29, 1910 |
| 1,804,324 | Weal | May 5, 1931 |
| 2,248,801 | Bernt | July 8, 1941 |
| 2,403,275 | Gilliam | July 2, 1946 |
| 2,443,577 | Finlay | June 15, 1948 |
| 2,545,558 | Russell | Mar. 20, 1951 |
| 2,583,294 | Erickson | Jan. 22, 1952 |
| 2,677,249 | Mason | May 4, 1954 |